(12) United States Patent
Chen et al.

(10) Patent No.: US 11,711,651 B2
(45) Date of Patent: Jul. 25, 2023

(54) BIDIRECTIONAL CHANNEL CONTROL SYSTEMS, METHODS, DEVICES AND COMPUTER READABLE STORAGEMEDUUMS

(71) Applicant: HANSONG (NANJING) TECHNOLOGY LTD., Jiangsu (CN)

(72) Inventors: Yang Chen, Nanjing (CN); Xunfu Yin, Nanjing (CN); Zhipeng Wang, Nanjing (CN); Fanjie Yuan, Nanjing (CN)

(73) Assignee: HANSONG (NANJING) TECHNOLOGY LTD., Nanjing (CN)

( * ) Notice: Subject to any disclaimer, the term of this patent is extended or adjusted under 35 U.S.C. 154(b) by 48 days.

(21) Appl. No.: 17/453,832

(22) Filed: Nov. 5, 2021

(65) Prior Publication Data

US 2022/0141587 A1   May 5, 2022

(30) Foreign Application Priority Data

Nov. 5, 2020   (CN) .......................... 202011219749.7

(51) Int. Cl.
    *H04R 3/00*     (2006.01)
    *H04R 3/12*     (2006.01)
    *G06F 3/16*     (2006.01)

(52) U.S. Cl.
    CPC ............... *H04R 3/12* (2013.01); *G06F 3/165* (2013.01); *H04R 3/005* (2013.01); *H04R 2430/01* (2013.01)

(58) Field of Classification Search
    CPC ...... H04R 2430/01; H04R 3/005; H04R 3/12; H04R 25/554; H04R 2420/07
    (Continued)

(56) References Cited

U.S. PATENT DOCUMENTS

| 8,488,822 B2* | 7/2013 | Klemmensen | ....... H04R 25/554 |
| | | | 381/314 |
| 10,212,207 B2 | 2/2019 | Albisu | |

(Continued)

FOREIGN PATENT DOCUMENTS

| CN | 1855958 A | 11/2006 |
| CN | 101212817 A | 7/2008 |

(Continued)

OTHER PUBLICATIONS

Notification to Grant Patent Right for Invention in Chinese Application No. 20201129749.7 dated Jan. 22, 2021, 6 pages.
(Continued)

*Primary Examiner* — Disler Paul
(74) *Attorney, Agent, or Firm* — Metis IP LLC

(57) ABSTRACT

A bidirectional channel control system, method, device, and non-transitory computer-readable storage medium based on Digital Enhanced Cordless Telecommunications is provided. The system comprises a transmitter, at least one receiver, an audio channel, and a text message control channel. The transmitter is configured to send an audio data stream to the at least one receiver through the audio channel. The transmitter is configured to send a control command to the one receiver through the text message control channel in a one-to-one single-point text message mode, and to receive a feedback result from the one receiver in response to the control command. Alternatively, the transmitter is configured to send a control command to each of the at least one receiver based on DECT protocol through the text message control channel in at least one of a one-to-many broadcast messaging mode and a one-to-one single-point messaging mode, and to receive a feedback result from each of the at least one receiver in response to the control command in the one-to-one single-point messaging mode.

18 Claims, 5 Drawing Sheets

(58) Field of Classification Search
USPC ............................................... 381/17, 77–80
See application file for complete search history.

(56) References Cited

U.S. PATENT DOCUMENTS

| | | | | |
|---|---|---|---|---|
| 10,531,247 | B2* | 1/2020 | Kashef | ................ H04L 65/1069 |
| 10,833,842 | B2* | 11/2020 | Papadopoulos | ........... H04L 9/06 |
| 11,026,277 | B2* | 6/2021 | Ehlert | ................... H04W 76/14 |
| 2008/0220767 | A1 | 9/2008 | Aretz et al. | |
| 2011/0090837 | A1* | 4/2011 | Duchscher | ............ H04L 65/611 |
| | | | | 370/312 |

FOREIGN PATENT DOCUMENTS

| | | |
|---|---|---|
| CN | 101997498 A | 3/2011 |
| CN | 102083005 A | 6/2011 |
| CN | 101965689 B | 4/2014 |
| CN | 104604259 A | 5/2015 |
| CN | 105120436 A | 12/2015 |
| CN | 105376689 A | 3/2016 |
| CN | 107533792 A | 1/2018 |
| CN | 111213373 A | 5/2020 |

OTHER PUBLICATIONS

Dwight FP Documentation Package, Dialog Semiconductor B.V., 2015, 376 pages.
Dwight FP Documentation Package, Dialog Semiconductor B.V., 2015, 312 pages.
Dwight PP API Documentation, RTX, 2014, 208 pages.
Dwight FP API Documentation, RTX, 2015, 183 pages.
First Office Action in Chinese Application No. 202011210749.7 dated Dec. 14, 2020, 13 pages.
The Second Office Action in Chinese Application No. 202011219749.7 dated Jan. 11, 2021, 13 pages.
Notification to Grant Patent Right for Invention in Chinese Application No. 202011219749.7 dated Jan. 22, 2021, 7 pages.

* cited by examiner

BIDIRECTIONAL CHANNEL CONTROL SYSTEMS, METHODS, DEVICES AND COMPUTER READABLE STORAGEMEDUUMS

CROSS-REFERENCE TO RELATED APPLICATION

This application claims priority of Chinese Patent Application No. 202011219749.7, filed on Nov. 5, 2020, the contents of which are entirely incorporated herein by reference.

TECHNICAL FIELD

The present disclosure relates to the field of Internet of Things and remote management, and more particularly to bidirectional channel control systems, methods, devices, and computer readable storage mediums based on digital enhanced cordless telecommunications (DECT).

BACKGROUND

A digital enhanced cordless telecommunications (DECT) system is an enhanced digital cordless telephone standard developed by European Telecommunications Standards Institute (ETSI), and an open digital communication standard evolving continuously. The DECT system may be mainly used for cordless telephone systems and provides a framework for cordless communications of high quality voice and data services, particularly in high user density and small range communications.

The protocol standard of DECT has the following advantages: high-capacity cell structure network paths; suitability for the high flexibility of networks; flexible and powerful features and site selections; high spectrum efficacy; reliable frequency access pathways with high quality and safety; usability under harsh radio conditions; comparable voice transmission quality to corded phones; low cost and highly efficient system parts; realization of high diversification of terminals; flexibility of broadband requirements; and, high flexibility of protocol expandability.

At present, the DECT technique is mostly applied in the field of wireless telecommunications, but it is rarely applied in the field of remote device management based on the Internet of things. Typically, remote management of multimedia devices is limited to audio data transmission and audio playback function. Therefore, there is an urgent need to develop bidirectional channel control systems and methods that integrate the audio playback function and the remote management control function of devices, to meet the increasing demand for remote management of Internet of Things devices.

SUMMARY

One aspect of the embodiments of the present disclosure provides a bidirectional channel control system based on Digital Enhanced Cordless Telecommunications. The system may include a transmitter, at least one receiver, an audio channel, and a text message control channel. The transmitter may send an audio data stream to the at least one receiver through the audio channel. The transmitter may send a control command to one of the at least one receivers in a one-to-one single-point short message mode through the text message control channel, and receives a feedback result from the one receiver in response to the control command. Alternatively, the transmitter may send a control command to each of the at least one receiver based on DECT protocol through the text message control channel in one of a one-to-many broadcast messaging mode and a one-to-one single-point messaging mode, and receive a feedback result from each of the at least one receiver in response to the control command in the one-to-one single-point messaging mode.

In some embodiments, the transmitter may be configured to send an audio data stream to each of the at least one receiver through the audio channel in a one-to-many unidirectional broadcast mode.

In some embodiments, the control command may include at least one of a device operation control command, a device status query command, or a partition control command, wherein the device operation control command includes at least one of a volume control command, a power-on command of the at least one receiver, a restart command of the at least one receiver, a parameter setting command of the at least one receiver, or an external device control command. The device status query command may be configured to query at least one of device status information, data error information, or switch information.

In some embodiments, the system may be configured to adjust the volume control command according to environmental noise data monitored in real-time, and a preset relationship between one or more parameters associated with environmental noises and one or more parameters associated with volume adjustment.

In some embodiments, the transmitter may be configured to send the device operation control command to each of the at least one receiver based on the DECT protocol through the text message control channel in the one-to-many broadcast messaging mode. In some embodiments, the transmitter may be configured to send the device status query command to each of the at least one receiver through the text message control channel in the one-to-one single-point messaging mode, and receive a feedback result associated with a device status in response to the device status query command from each of the at least one receiver in the one-to-one single-point messaging mode.

In some embodiments, in the one-to-one single-point messaging mode, each of the at least one receiver is configured to send an acknowledgment (ACK) of a received text message to the transmitter.

Another aspect of the embodiments of the present disclosure provides a method for controlling a bidirectional channel based on Digital Enhanced Cordless Telecommunications, the method including: sending, by a transmitter, an audio data stream to at least one receiver through the audio channel; sending, by the transmitter, a control command to one of the at least one receivers in a one-to-one single-point short message mode through the text message control channel, and receiving a feedback result in response to the control command from the one receiver. In some embodiments, the method may include: sending, by the transmitter, a control command to each of the at least one receiver based on a DECT protocol through the text message control channel in one of a one-to-many broadcast messaging mode and a one-to-one single-point messaging mode, and receiving a feedback result from each of the at least one receiver in response to the control command in the one-to-one single-point messaging mode.

In some embodiments, the above-mentioned method further comprises: sending, by the transmitter, the device operation control command to each of the at least one receiver based on the DECT protocol through the text message control channel in the one-to-many broadcast messaging mode; alternatively or in addition, sending, by the transmitter, the device status query command to each of the at least one receiver through the text message control channel in the one-to-one single-point messaging mode, and receiving, by the transmitter, a feedback result associated with a device status from each of the at least one receiver in response to the device status query command in the one-to-one single-point messaging mode.

Another aspect of the embodiments of the present disclosure provides a bidirectional channel control device based on Digital Enhanced Cordless Telecommunications (DECT) including at least one processor, wherein the at least one processor is configured to cause the device to perform the bidirectional channel control method based on Digital Enhanced Cordless Telecommunications described in the above embodiments.

Another aspect of the embodiments of the present disclosure, provides a non-transitory computer-readable storage medium comprising at least one set of instructions stored thereon, wherein, when executed by a computing device, the at least one set of instructions causes the computing device to perform the bidirectional channel control method based on Digital Enhanced Cordless Telecommunications described in the above embodiments.

DETAILED DESCRIPTION

Figure 1:
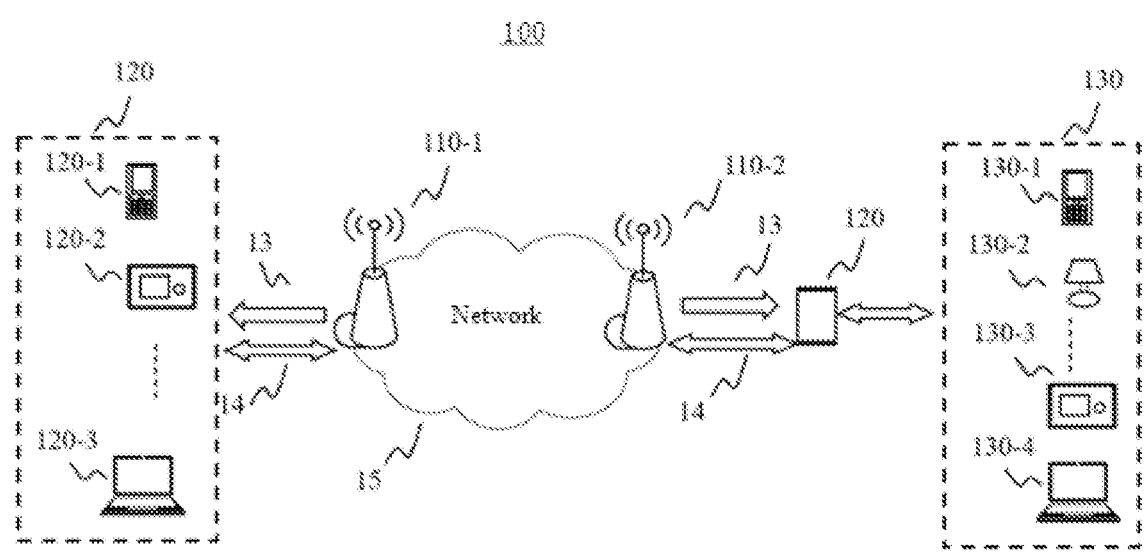
FIG. 1 illustrates an application scenario of a bidirectional channel control system 100 based on Digital Enhanced Cordless Telecommunications according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to the application according to these drawings. Other similar scenarios. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", "an" and/or "the" do not specifically refer to the singular, but may also include the plural. Generally speaking, the terms "including" and "contain" only suggest that the operations and elements that have been clearly identified are included, and these operations and elements do not constitute an exclusive list, and the method or device may also include other operations or elements.

Flow charts are used in the present disclosure to illustrate the operations performed by the system according to the embodiments of the present disclosure. It should be understood that the preceding or following operations are not necessarily performed precisely in order. Instead, the individual operations can be processed in reverse order or simultaneously. At the same time, users can also add other operations to these processes, or remove an operation or several operations from these processes.

FIG. 1 illustrates an application scenario diagram of a bidirectional channel control system 100 based on Digital Enhanced Cordless Telecommunications according to some embodiments of the present disclosure. As shown in FIG. 1, the bidirectional channel control system 100 based on Digital Enhanced Cordless Telecommunications may include a transmitter 110-1, a transmitter 110-2, one or more receivers 120, a plurality of external devices 130, an audio channel 13, a text message control channel 14 and a network 15. In some embodiments, the one or more receivers 120 may include a receiver 120-1, a receiver 120-2, a receiver 120-3, etc. The plurality of external devices 130 may include an external device 130-1, an external device 130-2, an external device 130-3, an external device 130-4, etc. The plurality of external devices 130 may be connected with the one or more receivers 120.

The transmitter 110-1 and the transmitter 110-2 may be configured to send an audio data stream and/or a control command to the one or more receivers 120 through the network 15. In some embodiments, at least one of the transmitter 110-1 and the transmitter 110-2 may include a fixed part (FP), a host, a base station, or the like, or a combination thereof. In some embodiments, at least one of the one or more receivers 120 may include a portable part (PP), a mobile phone, or other wireless devices.

It should be noted that, the count of transmitters here is only exemplary. In some embodiments, the count of transmitters may be one or more than two, and is not intended to be limited by the embodiments of the present disclosure.

The plurality of external devices 130 may be externally connected devices and/or equipment to the one or more receivers 120. For example, the plurality of external devices 130 may include an external light, a multimedia playback device, a computer, a mobile terminal, etc.

The audio channel 13 may be configured to send an audio data stream to at least one of the one or more receivers 120. For example, if the one or more receivers 120 includes one single receiver, the audio channel 13 may be configured to send an audio data stream to the one single receiver in a one-to-one unidirectional broadcast mode. As another example, if the one or more receivers 120 includes more than one receiver, the audio channel 13 may be configured to send an audio data stream to each of the more than one receiver in a one-to-many unidirectional broadcast mode. In some embodiments, the audio channel 13 may support the transmission of a left and right stereo audio data stream and may not support the transmission of control commands. In some embodiments, the one or more receivers 120 may include more than one receiver, each receiver of the more than one receiver may receive and play the audio data stream simultaneously without additional synchronization manners and/or control procedures of synchronization, therefore improving service efficiency. The unidirectional broadcast mode may refer to a single direction communication manner similar to a broadcast manner, and the one-to-one or one-to-many may indicate the number of recipients or audiences of said single direction communication.

Figure 2:
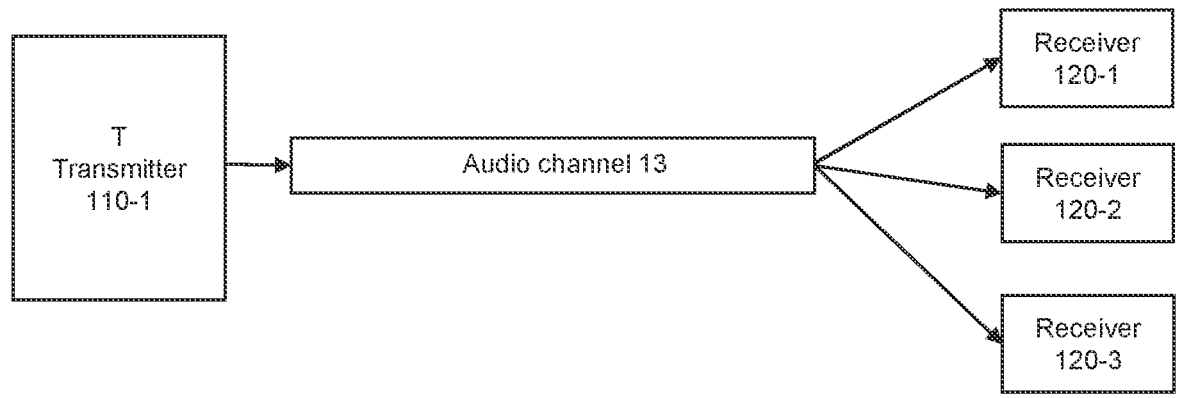
FIG. 2 illustrates an exemplary diagram of audio data stream transmission through an audio channel according to some embodiments of the present disclosure.

For example, FIG. 2 illustrates an exemplary diagram of audio data stream transmission through an audio channel according to some embodiments of the present disclosure. As show in FIG. 2, the transmitter 110-1 may send an audio data stream to the receiver 120-1, the receiver 120-2, and the receiver 120-3 through the audio channel 13 in a one-to-many unidirectional broadcast mode.

Referring back to FIG. 1, the text message control channel 14 may be configured to send a control command to at least one of the one or more receivers 120 in a messaging mode.

In some embodiments, the network 15 may be any form of wired or wireless network, or any combination thereof. For example, the network 15 may include a cable network, a wired network, an optical fiber network, a telecommunication network, an internal network, the Internet, a local area network (LAN), a wide area network (WAN), a wireless local area network (WLAN), a metropolitan area network (MAN), a public switched telephone network (PSTN), a DECT communication network, a Bluetooth network, Zig-Bee network, a near field communication (NFC) network, etc., or any combination thereof.

In some embodiments, each of the transmitter 110-1 and the transmitter 110-2 may send device operation control commands to at least one of the one or more receivers 120 in a one-to-many broadcast messaging mode based on the DECT protocol through the text message control channel 14. In some embodiments, the transmitter 110-1 and the transmitter 110-2 may send device status query commands to at least one of the one or more receivers 120 in a one-to-one single-point messaging mode through the text message control channel 14. The transmitter 110-1 and the transmitter 110-2 may receive one or more feedback results including device status information of and from at least one of the one or more receivers 120 in the one-to-one single-point messaging mode in response to the device status query command. The one-to-many broadcast messaging mode may be a text message communication mode where one message is being sent from one sender (e.g., a transmitter) to many recipients (e.g., one or more receivers) at the same time, allowing various information to be delivered to different recipients in just one transmission. The one-to-one single-point messaging mode may be a text message communication mode where one message is being sent from one sender to each recipient, allowing different recipients to receive different messages at different times. By providing the one-to-many broadcast messaging mode and the one-to-one single-point messaging mode, users may choose the preferred mode according to actual needs, thereby optimizing service procedures and improving service management efficiency.

The control command may be configured to control at least one of the one or more receivers 120 and/or the plurality of external devices 130. In some embodiments, the control command may include a device operation control command, a device status query command, a partition control command, etc. In some embodiments, the device operation control command may include at least one of a volume control command, a power-on command of a receivers, a restart command of a receivers, a parameter setting command of a receivers, or an external device control command. In some embodiments, the device status query command may be configured to query from the receivers at least one of device status information, data error information, or switch information. The switch information may be ON and OFF, a quantitative scale or metric set by a manufacturer, a percentage of maximum value, or the likes. For example, the control command may relate to: device status query (e.g. the first byte: RSSI; the second byte: reserved; the third and the fourth bytes: audio, data error information; the fifth, the sixth, and the seventh bytes: cola, boot, and app version information; the eighth byte: switch information of the PP terminals; the ninth and tenth bytes: reserved; the eleventh byte: CRC check), control of increasing and/or decreasing the volume, control of power-on and power-off and restart of PP terminals, switch pf lights, setting the RF parameters of the PP and so on. Through a variety of possible settings of control commands, the control and management of devices in many application scenarios may be satisfied.

In some embodiments, the system may be further configured to adjust the volume control command according to environmental noise data monitored in real-time and a preset relationship between the one or more parameters associated with environmental noises and one or more parameters associated with volume adjustment. The one or more parameters associated with environmental noises may be a measured decibel level in the environment, the difference in noise level between an audio device and the environment, or the likes. The one or more parameters associated with volume adjustment may be an increase or decrease in volume setting metrics, in percentage of maximum volume, a temporary mute, or the likes. The preset relationship may be a positive correlation between a measured decibel level and a percentage of maximum volume, a negative correlation between a measured noise and volume setting metrics, a trigger-type relation between a threshold of noise and a temporary mute, or the likes. The realization of real-time volume adjustment according to the environmental noise in a smart way may optimize the efficiency of audio management and improves the user experience.

In some embodiments, at least one of the one or more receivers 120 may be a smart audio device. For example, the smart audio device may be a wireless speaker. In some embodiments, the smart audio device may be placed in an environment together with a noise measuring device. The noise measuring device may be a Decibel meter, a smart cellphone, or the likes. The noise measuring device may measure the noise situation in the environment, and send the collected noise data to the transmitter 110 via a network or via other means. The transmitter 110 may include a control device for the smart audio device, such as a handhold device, a laptop, a tablet, or the likes. The noise measuring device may measure noises continuously or periodically. The control device may therefore effectively monitor the noise situation in the environment of the smart audio device, and then adjust the volume of the smart audio device according to the noise data in the environment. For example, in the case that the environment is a shopping mall and the smart audio device is a broadcast speaker, the volume may need to be increased when more people, hence more noise, are in the mall, so that people can hear the broadcast clearly in case of an emergency. For another example, in the case that the environment is a living room and the smart audio device is a Bluetooth speaker, the volume may need to be decreased when more noise is in the living room as people talk to each other. In some embodiments, after volume adjustment is triggered based on the received noise data, the control device may automatically adjust the volume of the smart audio device by sending a volume control command to the smart audio device based on the DECT protocol through a text message control channel between the control device and the smart audio device, while audio is playing through an audio channel between the control device and the smart audio device. The volume control command may be sent as a text message in a one-to-many broadcast messaging mode to multiple smart audio devices in the environment, adjusting the volume of these smart audio devices together and/or individually. For example, when one broadcast text message containing volume control commands is sent to three smart audio devices A, B and C, the text message may at the same time instruct device A to turn up volume to 90%, instruct device B to turn down volume to 50%, and contain no instruction for device C. The volume control command may also be sent as a text message in a one-to-one mode to each smart audio device. For example, when multiple noise measuring devices and multiple smart audio devices are in different parts of the environment, one-to-one mode may be more efficient than a broadcast mode in adjusting the volume of each smart audio device at different time and different rate. Therefore, different modes of sending commands based on the DECT protocol may be used and adjusted back and forth according to realistic needs to achieve maximum efficiency. For example, the control device may use the broadcast mode when more than half of all smart audio devices receives a same or similar command, whereas the control device may use the one-to-one mode when a particular audio device out of 100 devices needs to turn its volume down. As a result, volume adjustment of smart audio devices may be done automatically and intelligently without human interaction based on environmental noise, and without interrupting the audio channel used for audio data, hence increasing efficiency of the smart audio devices.

Figure 3:
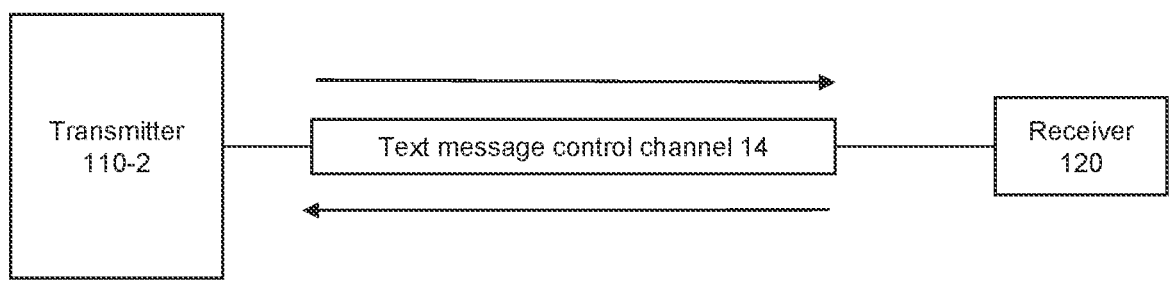
FIG. 3 illustrates an exemplary diagram of processing a control command through a text message control channel according to some embodiments of the present disclosure.

For example, FIG. 3 illustrates an exemplary diagram of processing a control command through a text message control channel according to some embodiments of the present disclosure. As shown in FIG. 3, the transmitter 110-2 may send a control command to the one or more receivers 120 in a one-to-one single-point messaging mode through the text message control channel 14, and receive a feedback result from the one or more receivers 120 in response to the control command.

Figure 4:
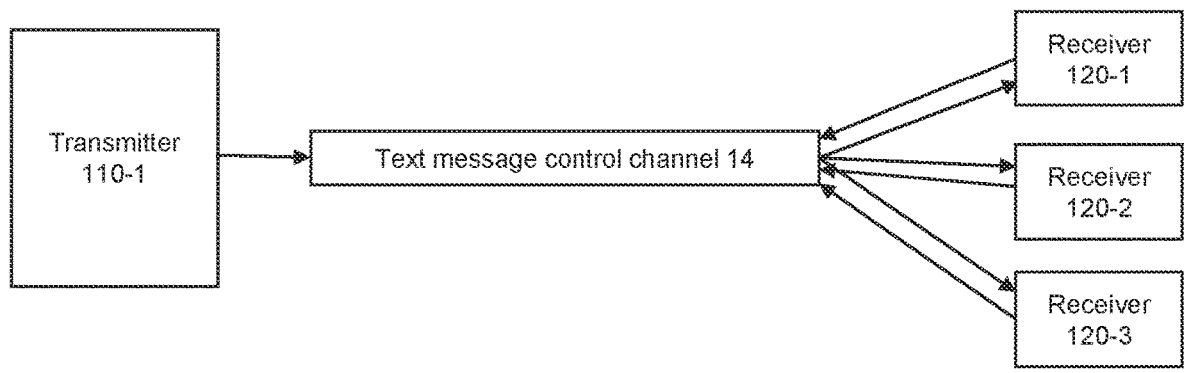
FIG. 4 illustrates an exemplary diagram of processing a control command through a text message control channel according to some other embodiments of the present disclosure.

As another example, FIG. 4 illustrates an exemplary diagram of processing a control command through a text message control channel according to some embodiments of the present disclosure. As shown in FIG. 4, the transmitter 110-1 may send a control command to at least one of the one or more receivers 120 in a one-to-many broadcast messaging mode based on the DECT protocol through the text message control channel 14, and receive a feedback result from at least one of the one or more receivers 120 in response to the control command in a one-to-one single-point messaging mode. As shown in FIG. 4, the message being sent to each of receiver 120-1, 120-2, and 120-3 is the same one, since the one-to-many broadcast messaging mode is used.

Figure 5:
FIG. 5 illustrates an exemplary diagram of processing a control command through a text message control channel according to yet some other embodiments of the present disclosure.

As still another example, FIG. 5 illustrates an exemplary diagram of processing a control command through a text message control channel according to some embodiments of the present disclosure. As shown in FIG. 5, the transmitter 110-1 may send a control command to at least one of the one or more receivers 120 in a one-to-one single point messaging mode through the text message control channel 14, and receive a feedback result from at least one of the one or more receivers 120 (e.g. receiver 120-1, receiver 120-2, and receiver 120-3) in response to the control command in a one-to-one single-point messaging mode. As shown in FIG. 5, the messages being sent to each of receiver 120-1, 120-2, and 120-3 are three different ones, since the one-to-one single point messaging mode is used.

In some embodiments, simultaneously sending the control command in a one-to-many broadcast messaging mode based on the DECT protocol may have less delay and higher efficiency compared to individually sending the control command in a one-to-one single-point messaging mode.

In some embodiments, the one or more receivers 120 in the one-to-many broadcast messaging mode may not need to send an acknowledgment (ACK) of a received text message to the transmitter 110-1 or 110-2. In some embodiments, the one or more receivers 120 in the one-to-one single-point messaging mode may need to send an acknowledgment (ACK) of a received text message to the transmitter 110-1 or 110-2. The core of the acknowledgement mechanism may be that, after a transmitter sends data to a receiver, the receiver may need to send an ACK (i.e. a receipt) back to the transmitter. In view of characteristics of the one-to-one single-point messaging mode, this setting of ACK mechanism may improve the reliability of data transmission and ensure service efficiency.

In some embodiments, according to coding protocols such as Type, Length, Target, Command, Parameter, and CRC, the transmitter 110-1 and the transmitter 110-2 may encode control commands and embed into Body of the text message, and send in a broadcast mode. Among them, Target may support All, Zone and a single receiver. This method supports various control commands, such as volume adjustment, partition control, and control of external devices connected to PP terminals (e.g. control of lights), etc.

In some embodiments, at least one of the one or more receivers 120 may receive the broadcast text message, decode the broadcast text message according to a corresponding coding protocol, and execute the decoded control commands if the target include itself. However, due to the nature of the broadcast based on DECT protocol, the one or more receivers 120 may not need to provide feedback. When feedback is required for a control command encoded in a broadcast text message, the feedback may be provided using a one to one single-point messaging mode as shown in FIG. 4.

In some embodiments, the transmitter 110-1 and the transmitter 110-2 may use point-to-point communication periodically, for example every 2 seconds, to send one-to-one text messages to individually query the latest device status of each device, via protocols such as Type, Length, Command, Parameter, CRC or the likes. Point-to-point communication may require the one or more receivers 120 to provide feedback. When the one or more receivers 120 provides feedback, some status information (e.g. RSSI, RX version, and other statuses) of the one or more receivers 120 may be attached to the ACK. In the spare bytes, the status of the one or more receivers 120 may be set according to the preset custom protocols such as RSSI, RX Version, Volume, and CRC or the likes.

In some embodiments, the process of the bidirectional channel control system 100 based on Digital Enhanced Cordless Telecommunications may include the following two procedures:

Procedure 1: the transmitter 110-1 may send an audio data stream to more than one of the one or more receivers 120 to play through the audio channel 13 in a one-to-many unidirectional broadcast mode, and no additional synchronization manner is required; the transmitter 110-1 may send control commands to the more than one of the one or more receivers 120 through the text massage control channel 14 in a one-to-many broadcast messaging mode based on a DECT protocol to control each receiver; and, the transmitter 110-1 may receive a feedback result from the more than one of the one or more receivers 120 in response to the control commands in the one-to-one single-point messaging mode.

Procedure 2: the transmitter 110-2 may send an audio data stream to one of the one or more receivers 120 to play through the audio channel 13 in a one-to-one unidirectional broadcast mode, and distribute the audio data stream to each of the external devices 130 through the one of the one or more receiver 120; the transmitter 110-2 may send a control command to the one of the one or more receivers 120 through the text message control channel 14 in a broadcast messaging mode based on the DECT protocol to control the one of the one or more receivers 120 as well as control each of the external devices 130; and, the transmitter 110-2 may receive a feedback result from the one of the one or more receivers 120 and/or each of the external devices 130 in a one-to-one single-point messaging mode.

The bidirectional channel control based on Digital Enhanced Cordless Telecommunications, as provided by the embodiments of the present disclosure, may simulate a bidirectional channel with an audio channel and a text message control channel based on the DECT protocol and the DECT text message function between at least one transmitter and at least one receiver, achieving the remote management and control of devices as well as the management of audio playback simultaneously. The existence of two parallel channels may allow one channel to be used for music playing while the other channel is used to receive control instructions and provide feedback at the same time. Differing from the traditional one-way broadcast system, simulating a two-way channel via text messages may allow the message sender who requests a response to receive a reply every time a message is sent, thereby achieving bidirectional communication in the sense of rules, optimizing the service process and efficiency, and largely improving user experience. The method for bidirectional channel control may be suitable for various network-based commercial remote management scenarios of IoT-connected devices through the DECT broadcast system. For example, a large chain store can remotely manage all the audio equipment in the store, such as content being played, parameters of the playback, etc., from its headquarter. For another example, remote diagnosis (e.g. whether an equipment is malfunctioning, etc.) may be achieved. In addition, the control and management of non-audio equipment (i.e. various sensors and appliances using DECT communication technique, such as lights, TVs, air conditioners, and so on) may be achieved.

In some embodiments, the system 100 may be an audio control system, including a control device as the transmitter 110 and one or more audio devices as the receivers 120. The control device may send an audio data stream, e.g. a playlist of songs, to the one or more audio devices through the audio channel. At the same time, the control device may send text messages containing control commands to the one or more audio devices through the text message control channel. The mode of sending text messages may be a one-to-one single-point messaging mode and/or a one-to-many broadcast messaging mode depending on realistic needs, such as if there is one audio device or multiple audio devices, or if a feedback of the command is required, etc. For example, the one-to-one single-point messaging mode may be used when the command is a device status query command, and/or when there is just one audio device. As another example, the one-to-many broadcast messaging mode may be used when there are multiple audio devices and multiple commands need to be sent at the same time. The control commands may instruct the audio devices to perform operations including adjusting audio volume, skipping to next and/or previous songs, pausing and playing, turning on and off, restarting, and sending back device status. With music transmitting through the audio channel and control commands transmitting through the text message control channel at the same time, the control device may control the audio devices without interrupting the music being played, hence increasing efficiency of the audio devices.

In some embodiments, the system 100 may be a multimedia control system, wherein the transmitters 110 may include a control devices, and the receivers 120 may be smart audio devices, lights, TVs, or the likes. In some embodiments, the smart audio devices, lights and TVs may be adjusted together for when uniformity is desired, e.g. a store may want the same music to play in each area of the store, the same lighting features, and/or the same commercials to run on each TV. For example, the control device may send a text message encoded with a power-on command to each of the smart audio devices, lights and TVs in each store using the broadcast messaging mode through the text message control channel based on a DECT protocol, so all receivers connected in the multimedia control system may be turned on at the same time, for example, at the store opening time. After turning on, the control devices may send an audio data stream, e.g. a playlist of songs, to each of the smart audio devices through the audio channel, to ensure all smart audio devices are playing the same music. The control device may also send a text message encoded with different parameter setting commands to each TV and/or each light in the store using the broadcast messaging mode through the text message control channel based on DECT protocol, in order to achieve multiple functionalities, such as setting the TV channels to the same one where commercials are playing, and setting lights to the same color.

In some embodiments, each of the smart audio devices, lights and TVs may be adjusted individually for when each has a different functionality. For example, the control device may send a separate text message encoded with different volume control commands and/or parameter setting commands to each of the smart audio devices and/or the TVs using the single-point messaging mode through the text message control channel based on a DECT protocol, in order to ensure each smart audio device and each TV is performing as intended. Alternatively or in addition, the control device may send one text message encoded with many different control commands to all of the smart audio devices and/or the TVs using the broadcast messaging mode through the text message control channel based on the DECT protocol, adjusting some or all of their settings differently based on the needs in each areas of the store.

In some embodiments, the control device may remotely identify a malfunction of at least one of smart audio devices, lights, TVs, etc., or perform diagnoses. The control device may send a text message encoded with a device status query command to each of the smart audio devices, lights, and TVs in each store using the single-point messaging mode through the text message control channel based on the DECT protocol, in order to check they are functioning properly. Upon receiving the device status query command, each of the functional smart audio devices, lights, and TVs may send a feedback result back to the control device in response to the device status query command in the one-to-one single-point messaging mode. If the control device fails to receive a feedback result from a certain device among the smart audio devices, lights, and TVs, or the feedback result indicates abnormality, the control device may further send a restart command and/or other parameter setting commands to the faulty device using the single-point messaging mode through the text message control channel based on the DECT protocol, in an attempt to fix the faulty device. If unsuccessful, maintenance may be needed for the faulty device that was identified in the device status query process.

In some embodiments, the store may include a receiver that is a sub control device. The sub control device may receive and send the above-mentioned communications from and to the control device via both the audio channel and the text message control channel based on DECT protocol, and then distribute these communications to the respective external devices 130 connected to the sub control device, such as smart audio devices, lights, TVs, or the likes. Using this method, non-DECT compatible devices which are otherwise communicable to the sub control device may be connected into the multimedia control system, and therefore may also be remotely and smartly managed by the control device like other DECT compatible devices.

The embodiment of the present disclosure may provide a bidirectional channel control method based on Digital Enhanced Cordless Telecommunications. The procedures of the bidirectional channel control method based on Digital Enhanced Cordless Telecommunications may be performed by the bidirectional channel control system 100 based on Digital Enhanced Cordless Telecommunications.

Figure 6:
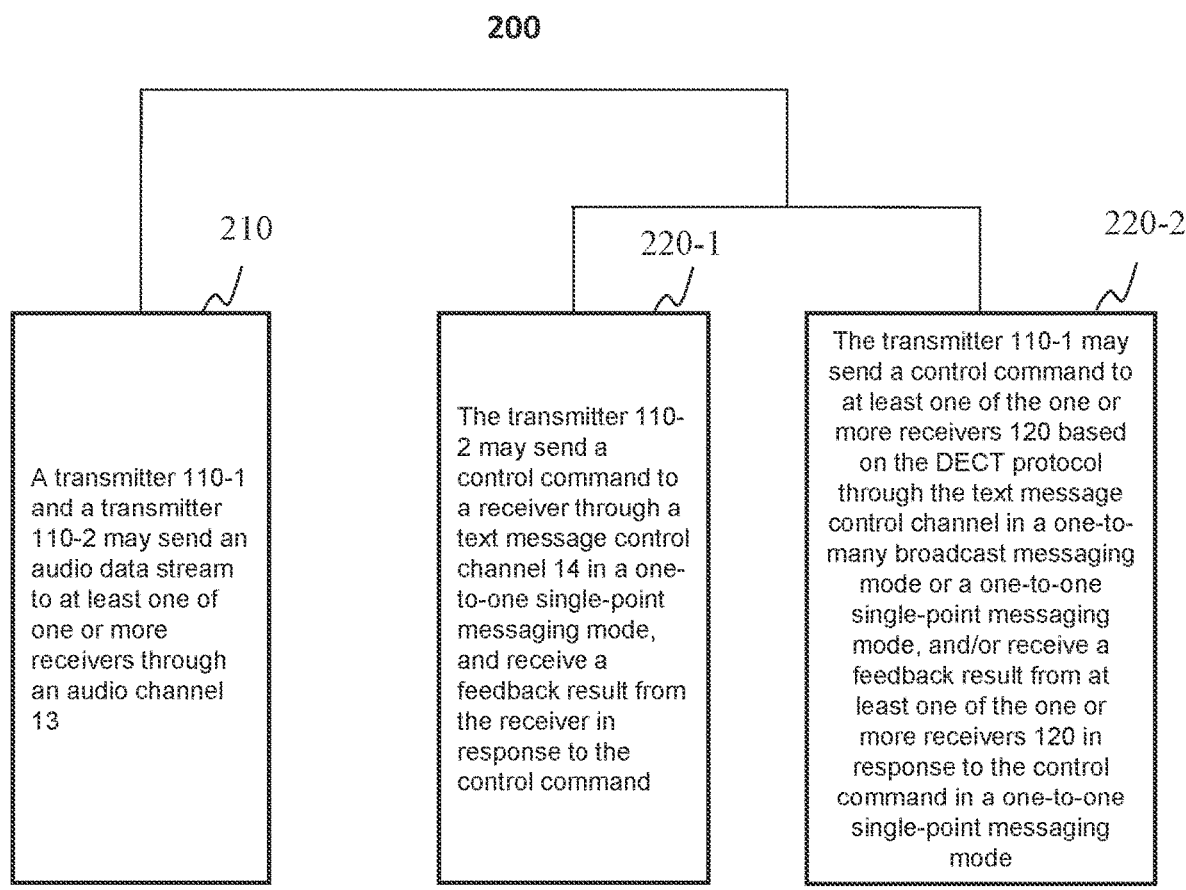
FIG. 6 illustrates an exemplary flowchart of a bidirectional channel control method 200 based on Digital Enhanced Cordless Telecommunications according to some embodiments of the present disclosure.

FIG. 6 is an exemplary flowchart illustrating a process of bidirectional channel control based on Digital Enhanced Cordless Telecommunications according to some embodiments of the disclosure. As shown in FIG. 6, the process 200 may include the following operations.

In 210: a transmitter 110-1 and a transmitter 110-2 may send an audio data stream to at least one of one or more receivers through an audio channel 13;

In 220-1: the transmitter 110-2 may send a control command to a receiver through a text message control channel 14 in a one-to-one single-point messaging mode, and receive a feedback result from the receiver in response to the control command;

In 220-2: the transmitter 110-1 may send a control command to at least one of the one or more receivers 120 based on the DECT protocol through the text message control channel in a one-to-many broadcast messaging mode or a one-to-one single-point messaging mode, and/or receive a feedback result from at least one of the one or more receivers 120 in response to the control command in a one-to-one single-point messaging mode.

Among them, operation 220-1 and operation 220-2 may be executed in an alternative manner. Regardless of whether operation 220-1 or operation 220-2 is executed, there may be no strict requirement on the sequence between operation 220 and operation 210, and they may be executed at the same time, or may be executed one after the other.

The transmitter 110-1 and the transmitter 110-2 may be configured to send an audio data stream and/or a control command to the one or more receivers 120 through the network 15. In some embodiments, at least one of the transmitter 110-1 and the transmitter 110-2 may include a fixed part (FP), a host, a base station, or the like, or a combination thereof. In some embodiments, at least one of the one or more receivers 120 may include a portable part (PP), a mobile phone, or other wireless devices.

It should be noted that, the count of transmitters here is only exemplary. In some embodiments, the count of transmitters may be one or more than two, and is not intended to be limited by the embodiments of the present disclosure.

In some embodiments, the plurality of external devices 130 may be externally connected devices and/or equipment to the one or more receivers 120. For example, the plurality of external devices 130 may include an external light, a multimedia playback device, a computer, a mobile terminal, etc.

In some embodiments, the audio channel 13 may be configured to send an audio data stream to at least one of the one or more receivers 120. For example, if the one or more receivers 120 includes one single receiver, the audio channel 13 may be configured to send an audio data stream to the one single receiver in a one-to-one unidirectional broadcast mode. As another example, if the one or more receivers 120 includes more than one receiver, the audio channel 13 may be configured to send an audio data stream to each of the more than one receiver in a one-to-many unidirectional broadcast mode. In some embodiments, the audio channel 13 may support the transmission of a left and right stereo audio data stream and may not support the transmission of control commands. In the case of the one or more receivers 120 including more than one receiver, each receiver of the one or more receivers 120 may receive and play the audio data stream simultaneously without additional synchronization manners and/or control procedures of synchronization.

In some embodiments, operation 210 may include the following procedures: referring back to FIG. 2, the transmitter 110-1 may send an audio data stream to the receiver 120-1, the receiver 120-2, and the receiver 120-3 through the audio channel 13 in a one-to-many unidirectional broadcast mode.

In some embodiments, the text message control channel 14 may be configured to send a control command to at least one of the one or more receivers 120 in the form of text messages.

In some embodiments, the network 15 may be any form of wired or wireless network, or any combination thereof. For example only, the network 15 may include a cable network, a wired network, an optical fiber network, a telecommunication network, an internal network, the Internet, a local area network (LAN), a wide area network (WAN), a wireless local area network (WLAN), a metropolitan area network (MAN), public switched telephone network (PSTN), DECT communication network, Bluetooth network, ZigBee network, near field communication (NFC) network, etc. or any combination thereof.

In some embodiments, operation 220-2 may include the following processes: the transmitter 110-1 and the transmitter 110-2 may send device status query commands to at least one of the one or more receivers 120 in a one-to-one single-point messaging mode through the text message control channel 14. The transmitter 110-1 and the transmitter 110-2 may receive one or more feedback results including device status information of and from at least one of the one or more receivers 120 in the one-to-one single-point messaging mode in response to the device status query command. By providing the one-to-many broadcast messaging mode and the one-to-one single-point messaging mode, users may choose the preferred mode according to actual needs, thereby optimizing service procedures and improving service management efficiency.

In some embodiments, The control command may be configured to control at least one of the one or more receivers 120 and/or the plurality of external devices 130. In some embodiments, the control command may include a device operation control command, a device status query command, a partition control command, etc. In some embodiments, the device operation control command may include at least one of a volume control command, a power-on command of a receivers, a restart command of a receivers, a parameter setting command of a receivers, or an external device control command. In some embodiments, the device status query command may be configured to query from the receivers at least one of device status information, data error information, or switch information. For example, the control command may relate to: device status query (e.g. the first byte: RSSI; the second byte: reserved; the third and the fourth bytes: audio, data error information; the fifth, the sixth, and the seventh bytes: cola, boot, and app version information; the eighth byte: switch information of the PP terminals; the ninth and tenth bytes: reserved; the eleventh byte: CRC check), control of increasing and/or decreasing the volume, control of power-on and power-off and restart of PP terminals, switch pf lights, setting the RF parameters of the PP and so on. Through a variety of possible settings of control commands, the control and management of devices in many application scenarios may be satisfied.

In some embodiments, the system may be further configured to adjust the volume control command according to environmental noise data monitored in real-time and a preset relationship between the environmental noise and the volume adjustment. The realization of real-time volume adjustment according to the environmental noise in a smart way may optimize the efficiency of audio management and improves the user experience.

In some embodiments, operation 220-1 may include the following procedures: referring back to FIG. 3, the transmitter 110-2 may send a control command to the one or more receivers 120 in a one-to-one single-point messaging mode through the text message control channel 14, and receive a feedback result from the one or more receivers 120 in response to the control command.

In some embodiments, operation 220-2 may include the following procedures: referring back to FIG. 4, the transmitter 110-1 may send a control command to at least one of the one or more receivers 120 in a one-to-many broadcast messaging mode based on the DECT protocol through the text message control channel 14, and receive a feedback result from at least one of the one or more receivers 120 in response to the control command in a one-to-one single-point messaging mode.

In some embodiments, operation 220-2 may include the following procedures: referring back to FIG. 5, the transmitter 110-1 may send a control command to at least one of the one or more receivers 120 in a one-to-one single point messaging mode through the text message control channel 14, and receive a feedback result from at least one of the one or more receivers 120 (e.g. receiver 120-1, receiver 120-2, and receiver 120-3) in response to the control command in a one-to-one single-point messaging mode.

Simultaneously sending the control command in a one-to-many broadcast messaging mode based on the DECT protocol may have less delay and higher efficiency compared to individually sending the control command in a one-to-one single-point messaging mode.

In some embodiments, in operation 220-2, the one or more receivers 120 in the one-to-many broadcast messaging mode may not need to send an acknowledgment (ACK) of a received text message to the transmitter 110-1 or 110-2. In some embodiments, the one or more receivers 120 in the one-to-one single-point messaging mode may need to send an acknowledgment (ACK) of a received text message to the transmitter 110-1 or 110-2. The core of the acknowledgement mechanism may be that, after a transmitter sends data to a receiver, the receiver may need to send an ACK (i.e. a receipt) back to the transmitter. In view of characteristics of the one-to-one single-point messaging mode, this setting of ACK mechanism may improve the reliability of data transmission and ensure service efficiency.

In some embodiments, according to coding protocols such as Type, Length, Target, Command, Parameter, and CRC, the transmitter 110-1 and the transmitter 110-2 may encode control commands and embed into Body of the text message, and send in a broadcast mode. Among them, Target may support All, Zone and a single receiver. This method supports various control commands, such as volume adjustment, partition control, and control of external devices connected to PP terminals (e.g. control of lights), etc.

In some embodiments, at least one of the one or more receivers 120 may receive the broadcast text message, decode the broadcast text message according to a corresponding coding protocol, and execute the decoded control commands if the target include itself. However, due to the nature of the broadcast based on DECT protocol, the one or more receivers 120 may not need to provide feedback. When feedback is required for a control command encoded in a broadcast text message, the feedback may be provided using a one to one single-point messaging mode as shown in FIG. 4.

In some embodiments, the transmitter 110-1 and the transmitter 110-2 may use point-to-point communication periodically, for example every 2 seconds, to send one-to-one text messages to individually query the latest device status of each device, via protocols such as Type, Length, Command, Parameter, CRC or the likes. Point-to-point communication may require the one or more receivers 120 to provide feedback. When the one or more receivers 120 provides feedback, some status information (e.g. RSSI, RX version, and other statuses) of the one or more receivers 120 may be attached to the ACK. In the spare bytes, the status of the one or more receivers 120 may be set according to the preset custom protocols such as RSSI, RX Version, Volume, and CRC or the likes.

In some embodiments, the process of implementing the bidirectional channel control method 200 based on Digital Enhanced Cordless Telecommunications by the bidirectional channel control system 100 based on Digital Enhanced Cordless Telecommunications may include the following two procedures.

Procedure 1: the transmitter 110-1 may send an audio data stream to more than one of the one or more receivers 120 to play through the audio channel 13 in a one-to-many unidirectional broadcast mode, and no additional synchronization manner is required; the transmitter 110-1 may send control commands to the more than one of the one or more receivers 120 through the text massage control channel 14 in a one-to-many broadcast messaging mode based on a DECT protocol to control each receiver; and, the transmitter 110-1 may receive a feedback result from the more than one of the one or more receivers 120 in response to the control commands in the one-to-one single-point messaging mode.

Procedure 2: the transmitter 110-2 may send an audio data stream to one of the one or more receivers 120 to play through the audio channel 13 in a one-to-one unidirectional broadcast mode, and distribute the audio data stream to each of the external devices 130 through the one of the one or more receiver 120; the transmitter 110-2 may send a control command to the one of the one or more receivers 120 through the text message control channel 14 in a broadcast messaging mode based on the DECT protocol to control the one of the one or more receivers 120 as well as control each of the external devices 130; and, the transmitter 110-2 may receive a feedback result from the one of the one or more receivers 120 and/or each of the external devices 130 in a one-to-one single-point messaging mode.

The bidirectional channel control based on Digital Enhanced Cordless Telecommunications, as provided by the embodiments of the present disclosure, may simulate a bidirectional channel with an audio channel and a text message control channel based on the DECT protocol and the DECT text message function between at least one transmitter and at least one receiver, achieving the remote management and control of devices as well as the management of audio playback simultaneously. The existence of two parallel channels may allow one channel to be used for music playing while the other channel is used to receive control instructions and provide feedback at the same time. Differing from the traditional one-way broadcast system, simulating a two-way channel via text messages may allow the message sender who requests a response to receive a reply every time a message is sent, thereby achieving bidirectional communication in the sense of rules, optimizing the service process and efficiency, and largely improving user experience. The method for bidirectional channel control may be suitable for various network-based commercial remote management scenarios of IoT-connected devices through the DECT broadcast system. For example, a large chain store can remotely manage all the audio equipment in the store, such as content being played, parameters of the playback, etc., from its headquarter. For another example, remote diagnosis (e.g. whether an equipment is malfunctioning, etc.) may be achieved. In addition, the control and management of non-audio equipment (i.e. various sensors and appliances using DECT communication technique, such as lights, TVs, air conditioners, and so on) may be achieved.

The embodiments of the present disclosure also provide a bidirectional channel control device based on Digital Enhanced Cordless Telecommunications.

Figure 7:
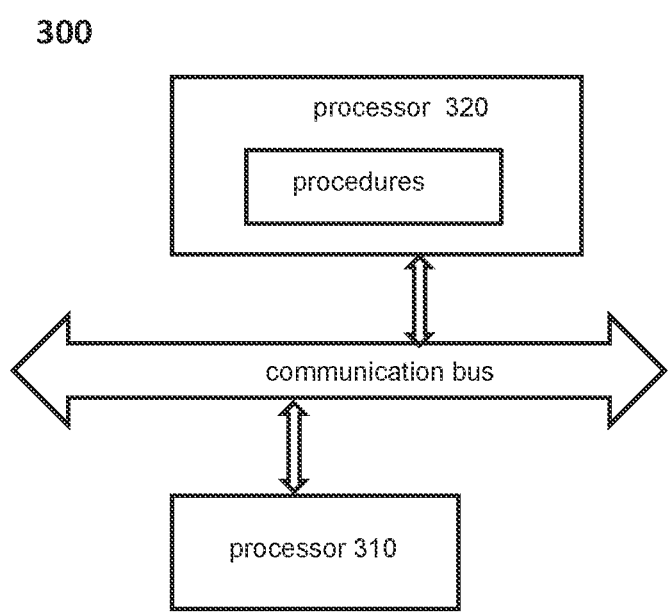
FIG. 7 illustrates an exemplary structural diagram of a bidirectional channel control device 300 based on Digital Enhanced Cordless Telecommunications according to some embodiments of the present disclosure.

FIG. 7 illustrates an exemplary structural diagram of a bidirectional channel control device 300 based on Digital Enhanced Cordless Telecommunications according to some embodiments of the present disclosure. The device 300 may include a processor 310 configured to execute any of the bidirectional channel control methods based on Digital Enhanced Cordless Telecommunications as provided in the embodiments of the present disclosure.

In some embodiments, the processor 310 may include any suitable type of general-purpose or special-purpose microprocessors, digital signal processors, or microcontrollers. In some embodiments, the processor 310 may include multiple functional modules to execute the procedures of the bidirectional channel control method based on Digital Enhanced Cordless Telecommunications.

In some embodiments, the bidirectional channel control device 300 based on Digital Enhanced Cordless Telecommunications may include memory 320. The memory 320 may store a program, and the processor 310 may execute the bidirectional channel control method based on Digital Enhanced Cordless Telecommunications by executing the program. In some embodiments, the memory 320 may include a volatile or non-volatile, magnetic, semiconductor, magnetic tape, optical, removable, non-removable, or other type of storage device or tangible (non-transitory) computer readable Media, including but not limited to ROM, flash memory, dynamic RAM, static RAM.

Embodiments of the present disclosure also provide a computer-readable storage medium that stores computer instructions, when the computer reads the computer instructions in the storage medium, the computer executes any bidirectional channel control method based on Digital Enhanced Cordless Telecommunications as in the embodiments of this disclosure. In some embodiments, the computer-readable storage medium may include volatile or non-volatile, magnetic, semiconductor, tape, optical, removable, non-removable, or other types of computer-readable storage media or computer-readable storage devices. For example, the storage medium may be a storage device or a storage module on which computer instructions are stored. In some embodiments, the computer-readable storage medium may be a disk or flash drive on which computer instructions are stored.

The bidirectional channel control method based on Digital Enhanced Cordless Telecommunications, as provided by the embodiments of the present disclosure, may simulates a bidirectional channel with an audio channel and a text message control channel based on the DECT protocol and the DECT text message function between at least one transmitter and at least one receiver, achieving the remote management and control of devices as well as the management of audio playback simultaneously. The existence of two parallel channels may allow one channel to be used for music playing while the other channel is used to receive control instructions and provide feedback at the same time. Differing from the traditional one-way broadcast system, simulating a two-way channel via text messages may allow the message sender who requests a response to receive a reply every time a message is sent, thereby achieving bidirectional communication in the sense of rules, optimizing the service process and efficiency, and largely improving user experience. The method for bidirectional channel control may be suitable for various network-based commercial remote management scenarios of IoT-connected devices through the DECT broadcast system. For example, a large chain store can remotely manage all the audio equipment in the store, such as content being played, parameters of the playback, etc., from its headquarter. For another example, remote diagnosis (e.g. whether an equipment is malfunctioning, etc.) may be achieved. In addition, the control and management of non-audio equipment (i.e. various sensors and appliances using DECT communication technique, such as lights, TVs, air conditioners, and so on) may be achieved.

It should be understood that the bidirectional channel control system, equipment, and computer-readable storage medium based on Digital Enhanced Cordless Telecommunications provided by the embodiments of the present disclosure may be implemented by hardware, software, or a combination of software and hardware, wherein, a hardware part may be implemented by using special logic; a software part may be stored in a memory and executed by an appropriate instruction executing system, such as a microprocessor or specially designed hardware. Those skilled in the art may understand that the above-mentioned method and system may be implemented by using computer-executable instructions and/or by being included in processor control codes, for example, on a carrier medium such as a magnetic disk, CD or DVD-ROM, a programmable memory such as a read-only memory (firmware) or a data carrier such as an optical or electronic signal carrier, such a code is provided. The system and its modules of the present disclosure not only may be implemented by hardware circuits such as super-large-scale integrated circuits or gate arrays, semi-conductors such as logic chips, and transistors, or programmable hardware devices such as field programmable gate arrays, and programmable logic devices, but also may be implemented by software executed by various types of processors, or may also be implemented by a combination of the above hardware circuit and software (e.g., firmware).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system.". Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 1703, Perl, COBOL 1702, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

We claim:

1. A bidirectional channel control system based on digital enhanced cordless telecommunications (DECT), comprising:
    a transmitter, at least one receiver, an audio channel, and a text message control channel, wherein the audio channel supports the transmission of an audio data stream and not support the transmission of a control command, and the text message control channel supports the transmission of a control commend and a feedback result from the at least one receiver;
    the transmitter includes a fixed part, a host or a base station, and the transmitter is configured to send a control command to each of the at least one receiver based on a DECT protocol through the text message control channel in one of a one-to-many broadcast messaging mode and a one-to-one single-point messaging mode, and the transmitter is further configured to receive a feedback result from each of the at least one receiver in response to the control command in the one-to-one single-point messaging mode, wherein
    the control command includes a device operation control command, a device status query command, and a partition control command, wherein
        the device operation control command includes at least one of a volume control command, a power-on command of the at least one receiver, a restart command of the at least one receiver, a parameter setting command of the at least one receiver, or an external device control command, and
        the device status query command is configured to query at least one of device status information, data error information, or switch information.

2. The system of claim 1, wherein the transmitter is further configured to send an audio data stream to each of the at least one receiver through the audio channel in a one-to-many unidirectional broadcast mode.

3. The system of claim 1, wherein the system is further configured to adjust the volume control command according to environmental noise data and a preset relationship between one or more parameters associated with environmental noises and one or more parameters associated with volume adjustment.

4. The system of claim 3, wherein the one or more parameters associated with volume adjustment include an increase or decrease in volume setting metrics, in percentage of maximum volume, and a temporary mute.

5. The system of claim 3, wherein the preset relationship includes a positive correlation between a measured decibel level and a percentage of maximum volume, a negative correlation between a measured noise and volume setting metrics, and a trigger-type relation between a threshold of noise and a temporary mute.

6. The system of claim 1, wherein the transmitter is further configured to perform at least one of two operations including:
    sending the device operation control command to each of the at least one receiver based on the DECT protocol through the text message control channel in the one-to-many broadcast messaging mode; and
    sending the device status query command to each of the at least one receiver through the text message control channel in the one-to-one single-point messaging mode, and receiving a feedback result associated with a device status from each of the at least one receiver in response to the device status query command in the one-to-one single-point messaging mode.

7. The system of claim 1 wherein in the one-to-one single-point messaging mode, each of the at least one receiver is configured to send an acknowledgement of a received text message to the transmitter.

8. The system of claim 1, further comprising:
    a second transmitter, wherein the transmitter and the second transmitter use point-to-point communication periodically to send one-to-one text messages to individually query latest device status of each of the at least one receiver.

9. The system of claim 1, wherein the transmitter is configured to send a separate text message encoded with different volume control commands and/or parameter setting commands to each of the at least one receiver using the one-to-one single-point messaging mode through the text message control channel based on the DECT protocol.

10. The system of claim 1, wherein the transmitter includes a control device, and the at least one receiver includes a sub control device that is connected with one or more external devices, the one or more external devices includes non-DECT compatible devices, and the one or more external devices are managed by the control device through the sub control device.

11. A method for controlling a bidirectional channel based on Digital Enhanced Cordless Telecommunications (DECT), comprising:
    sending, by a transmitter, an audio data stream to each of at least one receiver through an audio channel in a one-to-many unidirectional broadcast mode;
    sending, by the transmitter, a control command to each of the at least one receiver based on a DECT protocol through a text message control channel in one of a one-to-many broadcast messaging mode and a one-to-one single-point messaging mode, wherein the transmitter includes a fixed part, a host or a base station, the audio channel supports the transmission of an audio data stream and not support the transmission of a control command, and the text message control channel supports the transmission of a control commend and a feedback result from the at least one receiver; and receiving, by the transmitter, a feedback result from each of the at least one receiver in response to the control command in the one-to-one single-point messaging mode, wherein the control command includes a device operation control command, a device status query command, and a partition control command, wherein the device operation control command includes at least one of a volume control command, a power-on command of the at least one receiver, a restart command of the at least one receiver, a parameter setting command of the at least one receiver, or an external device control command, and the device status query command is configured to query at least one of device status information, data error information, and switch information.

12. The method of claim 11, further comprising at least one of two operations including:

sending, by the transmitter, the device operation control command to each of the at least one receiver based on the DECT protocol through the text message control channel in the one-to-many broadcast messaging mode; and sending, by the transmitter, the device status query command to each of the at least one receiver through the text message control channel in the one-to-one single-point messaging mode, and receiving, by the transmitter, a feedback result associated with a device status from each of the at least one receiver in response to the device status query command in the one-to-one single-point messaging mode.

13. The method of claim 11, further comprising:

adjusting the volume control command according to environmental noise data and a preset relationship between one or more parameters associated with environmental noises and one or more parameters associated with volume adjustment.

14. The method of claim 11, wherein in the one-to-one single-point messaging mode, sending, by each of the at least one receiver, an acknowledgment of a received text message to the transmitter.

15. A bidirectional channel control device based on Digital Enhanced Cordless Telecommunications (DECT) including at least one processor configured to perform a method for controlling a bidirectional channel based on Digital Enhanced Cordless Telecommunications (DECT), the method including:

sending, by a transmitter, an audio data stream to each of at least one receiver through an audio channel in a one-to-many unidirectional broadcast mode;

sending, by the transmitter, a control command to each of the at least one receiver based on a DECT protocol through a text message control channel in one of a one-to-many broadcast messaging mode and a one-to-one single-point messaging mode, wherein the transmitter includes a fixed part, a host or a base station, the audio channel supports the transmission of an audio data stream and not support the transmission of a control command, and the text message control channel supports the transmission of a control commend and a feedback result from the at least one receiver; and receiving, by the transmitter, a feedback result from each of the at least one receiver in response to the control command in the one-to-one single-point messaging mode, wherein the control command includes a device operation control command, a device status query command, and a partition control command, wherein the device operation control command includes at least one of a volume control command, a power-on command of the at least one receiver, a restart command of the at least one receiver, a parameter setting command of the at least one receiver, or an external device control command, and the device status query command is configured to query at least one of device status information, data error information, and switch information.

16. The device of claim 15, wherein the method further comprises:

sending the device operation control command to each of the at least one receiver based on the DECT protocol through the text message control channel in the one-to-many broadcast messaging mode; and/or sending the device status query command to each of the at least one receiver through the text message control channel in the one-to-one single-point messaging mode, and receiving, by the transmitter, a feedback result associated with a device status from each of the at least one receiver in response to the device status query command in the one-to-one single-point messaging mode.

17. The device of claim 15, wherein the processor is further configured to cause the device to perform operations including:

adjusting the volume control command according to environmental noise data and a preset relationship between one or more parameters associated with environmental noises and one or more parameters associated with volume adjustment.

18. The device of claim 15, wherein the processor is further configured to cause the device to perform operations including:

in the one-to-one single-point messaging mode, causing each of the at least one receiver to send an acknowledgment of a received text message to the device.

* * * * *